US008370486B2

(12) United States Patent  
Kim

(10) Patent No.: US 8,370,486 B2  
(45) Date of Patent: *Feb. 5, 2013

(54) SOCIAL NEWS RANKING USING GOSSIP DISTANCE

(75) Inventor: Eun-Gyu Kim, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,188

(22) Filed: Oct. 21, 2011

(65) Prior Publication Data

US 2012/0041806 A1    Feb. 16, 2012

Related U.S. Application Data

(63) Continuation of application No. 12/947,782, filed on Nov. 16, 2010, now Pat. No. 8,219,631, which is a continuation of application No. 11/947,647, filed on Nov. 29, 2007, now Pat. No. 7,895,284.

(51) Int. Cl.  
G06F 15/16 (2006.01)

(52) U.S. Cl. ............................ 709/224; 709/218

(58) Field of Classification Search .......... 709/207  
See application file for complete search history.

(56) References Cited

U.S. PATENT DOCUMENTS

| | | | |
|---|---|---|---|
| 5,974,442 A | 10/1999 | Adams | |
| 7,024,404 B1 | 4/2006 | Gerasoulis et al. | |
| 7,069,303 B2 | 6/2006 | Sikora et al. | |
| 7,174,382 B2 | 2/2007 | Ramanathan et al. | |
| 7,366,759 B2 | 4/2008 | Trevithick et al. | |
| 7,376,715 B2 | 5/2008 | Cunningham et al. | |
| 7,587,461 B2 | 9/2009 | Baluja et al. | |
| 7,765,265 B1 | 7/2010 | Granito et al. | |
| 8,146,001 B1 * | 3/2012 | Reese | 715/752 |
| 2002/0138581 A1 | 9/2002 | MacIntosh et al. | |
| 2004/0054733 A1 | 3/2004 | Weeks | |
| 2004/0162071 A1 | 8/2004 | Grilli et al. | |
| 2005/0171954 A1 | 8/2005 | Hull et al. | |
| 2005/0174975 A1 | 8/2005 | Mgrdechian et al. | |
| 2005/0198160 A1 | 9/2005 | Shannon et al. | |
| 2005/0203800 A1 | 9/2005 | Sweeney et al. | |
| 2005/0203801 A1 | 9/2005 | Morganstern et al. | |

(Continued)

FOREIGN PATENT DOCUMENTS

EP    1591939 A2    2/2005

OTHER PUBLICATIONS

"Pownce," Wikipedia, http://en.wikipedia.org/w/index.php?title=Pownce&Printable=yes, pp. 1-2, accessed Nov. 27, 2007.  
"Pownce, Send Stuff to Your Friends," http://pownce.com/, pp. 1-3, accessed Nov. 27, 2007.  
Official Communication for U.S. Appl. No. 11/957,069 mailed Oct. 26, 2009.

(Continued)

Primary Examiner — Lynn Feild  
Assistant Examiner — Bryan Lee  
(74) Attorney, Agent, or Firm — Frommer Lawrence & Haug LLP; Jamie L. Wiegand

(57) ABSTRACT

Devices, systems, and methods are directed towards ranking of messages based on a hop distance a forwarded message travels through a social network. As a message is forwarded by a member of the social network the hop distance increases. As the message is forwarded, recipients and/or senders may view the hop distance in real-time. The hop distance may reflect a number of times the message is forwarded to reach a recipient, or the maximum number of times the message is forwarded. The message may be displayed to a member in a rank ordering based on the hop distance, and messages with hop distances below a defined value may be deleted from a displayed list after a period of time. In one embodiment, a message may be forwarded anonymously to, for example, encourage members to forward the message.

19 Claims, 5 Drawing Sheets

U.S. PATENT DOCUMENTS

| | | |
|---|---|---|
| 2005/0278438 A1 | 12/2005 | Sandaire |
| 2006/0042483 A1 | 3/2006 | Work et al. |
| 2006/0136560 A1 | 6/2006 | Jiang |
| 2006/0143236 A1 | 6/2006 | Wu |
| 2006/0173824 A1 | 8/2006 | Bensky et al. |
| 2006/0235873 A1 | 10/2006 | Thomas |
| 2006/0235933 A1 | 10/2006 | Baluja et al. |
| 2006/0271564 A1 | 11/2006 | Meng Muntz et al. |
| 2007/0088711 A1 | 4/2007 | Craggs |
| 2007/0088785 A1 | 4/2007 | Cama |
| 2007/0112761 A1 | 5/2007 | Xu et al. |
| 2007/0169165 A1 | 7/2007 | Crull et al. |
| 2007/0179945 A1 | 8/2007 | Marston et al. |
| 2007/0180043 A1 | 8/2007 | Vernal et al. |
| 2007/0252004 A1 | 11/2007 | Shiraki et al. |
| 2007/0255807 A1 | 11/2007 | Hayashi et al. |
| 2007/0271336 A1* | 11/2007 | Ramaswamy ............... 709/204 |
| 2008/0004944 A1 | 1/2008 | Calabria |
| 2008/0005108 A1 | 1/2008 | Ozzie et al. |
| 2008/0028294 A1 | 1/2008 | Sell et al. |
| 2008/0052369 A1 | 2/2008 | Weber et al. |
| 2008/0052371 A1 | 2/2008 | Partovi et al. |
| 2008/0301237 A1 | 12/2008 | Parsons et al. |
| 2009/0143051 A1 | 6/2009 | Kim |
| 2009/0144377 A1 | 6/2009 | Kim et al. |
| 2009/0157845 A1 | 6/2009 | Kim et al. |
| 2009/0158176 A1 | 6/2009 | Kalaboukis et al. |
| 2009/0319628 A1 | 12/2009 | Kumpula et al. |
| 2010/0042944 A1 | 2/2010 | Robinson et al. |
| 2010/0169492 A1 | 7/2010 | Lee |
| 2011/0066725 A1 | 3/2011 | Kim |
| 2011/0087734 A1 | 4/2011 | Parsons et al. |

OTHER PUBLICATIONS

Official Communication for U.S. Appl. No. 11/957,069 mailed Jun. 4, 2010.

Official Communication for U.S. Appl. No. 11/948,887 mailed Sep. 9, 2009.

Official Communication for U.S. Appl. No. 11/948,887 mailed Nov. 16, 2009.

Official Communication for U.S. Appl. No. 11/948,887 mailed May 17, 2010.

Official Communication for U.S. Appl. No. 11/948,887 mailed Oct. 13, 2010.

Official Communication for U.S. Appl. No. 11/948,887 mailed Jan. 6, 2011.

Official Communication for U.S. Appl. No. 11/947,647 mailed Apr. 15, 2010.

Official Communication for U.S. Appl. No. 11/947,647 mailed Aug. 19, 2010.

Official Communication for U.S. Appl. No. 11/947,647 mailed Nov. 29, 2010.

Official Communication for U.S. Appl. No. 12/947,782 mailed Apr. 4, 2011.

Official Communication for U.S. Appl. No. 12/947,782 mailed Jul. 22, 2011.

Official Communication for U.S. Appl. No. 11/957,069 mailed May 11, 2012.

Official Communication for U.S. Appl. No. 12/947,782 mailed Mar. 15, 2012.

* cited by examiner

SOCIAL NEWS RANKING USING GOSSIP DISTANCE

CROSS-REFERENCE TO RELATED APPLICATION

This utility patent application is a continuation of U.S. patent application Ser. No. 12/947,782 filed on Nov. 16, 2010, entitled "Social News Ranking Using Gossip Distance," which in turn is a continuation U.S. patent application Ser. No. 11/947,647 filed on Nov. 29, 2007, and entitled "Social News Ranking Using Gossip Distance," the benefit of which is each claimed under 35 U.S.C. §120, and of which both are incorporated herein by reference.

TECHNICAL FIELD

The present invention relates generally to social networking and, more particularly, but not exclusively to managing communications based on a hop distance that a message travels through a social network.

BACKGROUND

Tremendous changes have been occurring in the Internet that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One aspect of our everyday lives that may be affected by online social networking technology is the ease in which news stories and other forms of gossip may be shared over the internet. Gossip and other forms of word-of-mouth communications have been considered to be a great source of news for centuries. However, all too often while some shared news or gossip may be interesting to some people; it may not be interesting to others. One approach for determining how interesting such shared news or gossip may be is to have people vote on it. The more often someone votes positively for an item, the more likely it is popular. However, merely because something is highly popular generally, it does not indicate that it is interesting to a particular audience. For example, the fact that a thousand people voted a particular article very high may say little about whether a different thousand people would find the article interesting at all. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
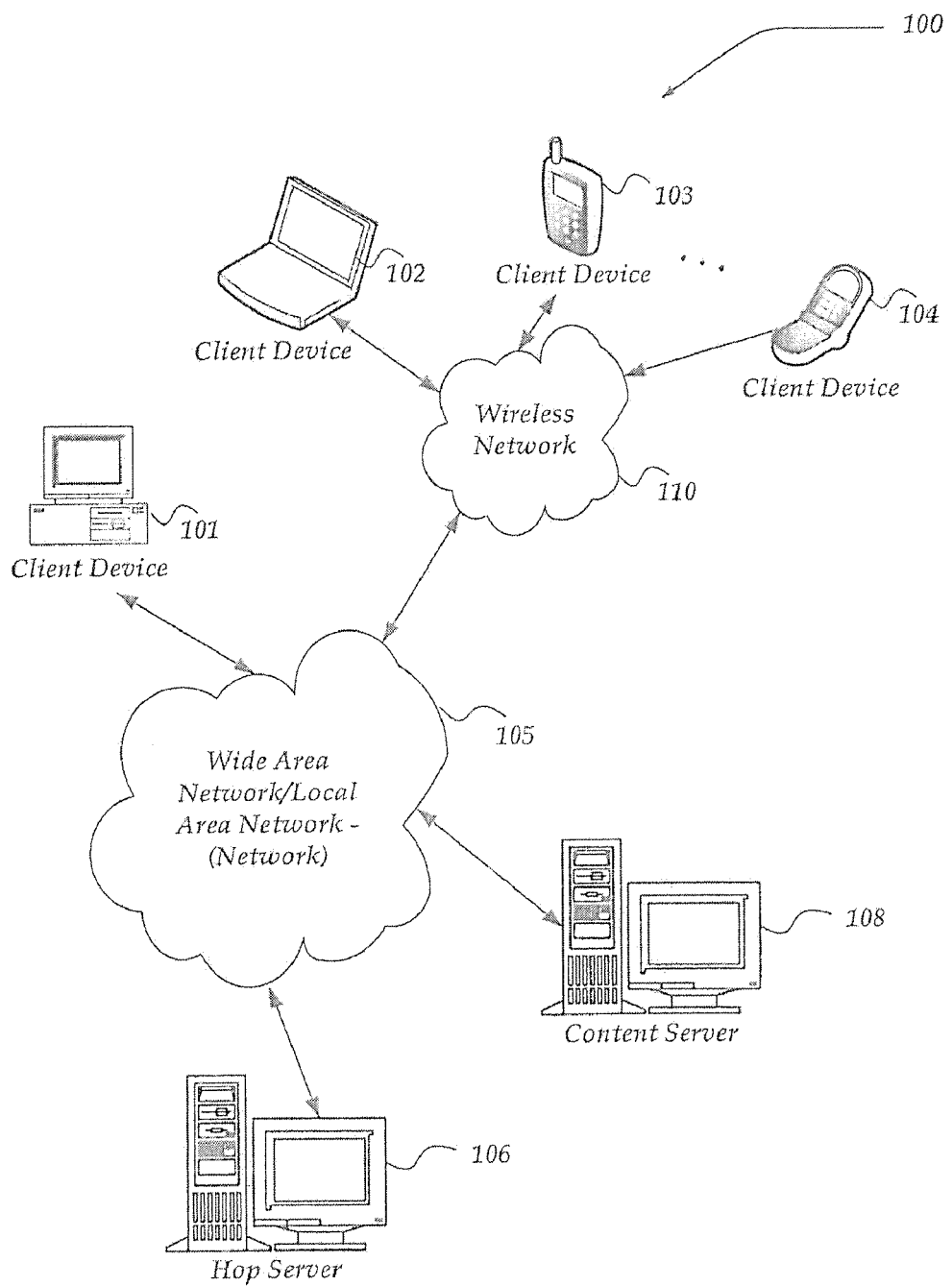
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

As used herein, the terms "social network" and "social community" refer to a concept that an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards managing messages based on a hop distance as the message is forwarded through a social network. In one embodiment, the hop distance may indicate a level of interest in the message by members of the social network. As a message is forwarded by a member of the social network the hop distance increases. Thus, when the message is forwarded from one member to one or more members the hop distance may increase by one hop. If one or more of these members in turn forward the message to yet one or more other members, the hop distance may again increases by one, in real-time. As the message is forwarded, the senders in a chain of senders of the message may view on a display device the hop distance change in real-time. Such hop distance information may then be used to determine whether the message is news-worthy, or potentially interesting. That is, the higher the hop distance, the more times that the message was forwarded, the may likely that the message is considered to be news-worthy. In one embodiment, the message may be displayed to a recipient in a rank ordering based on the hop distance, placing messages with higher hop distances at a higher ranked position on a list of messages than messages with lower hop distances. In one embodiment, messages with hop distances below a defined value may be deleted or otherwise hidden from a displayed list of messages after a period of time. In one embodiment, all members receiving the message may see the hop distance reflect, in real-time, a maximum number of times the message is forwarded. In another embodiment, members that do not forward the message might see the hop distance instead reflect the number of times the message was forwarded to reach the non-forwarding member, and not necessarily the maximum times the message is forwarded overall within the social network. In one embodiment, the message may be forwarded anonymously to, for example, encourage members to forward the message. In one embodiment, the message may be forwarded based on a member's contact list, or the like, so that the forwarding member need not explicitly identify to whom the message is to be sent. In one embodiment, the member may select to forward a same message multiple times. In another embodiment, the member may explicitly identify to whom the message is to be sent. The system may also keep track of those to whom the message has already been sent, so that the message is not sent to the same member multiple times, and so that newly added members to a contact list may receive the message. In this manner, the member may send the message to new members without having to keep track of those that might already have received the message.

It has been observed that many human relationships tend to form into clusters based on similar interests, backgrounds, demographics, or the like. Simply put, people are more likely to make relationships with others of similar interests. Based, in part, on this assumption, propagating news items through an intricate network of human relationships, instead of providing uniform content for all users, is expected to have a higher chance of delivering more relevant information for each recipient. If certain news items travel too far out of an interest cluster it may be considered non-interesting to recipients in the other clusters and may therefore be deleted or left un-forwarded. Thus, human relationships may be used as a "filter" for each message of a given network. For this reason the distance that a gossip or a news item travels may provide a measure of at least the following:

1) Interestingness: How interesting a gossip or news item is. The more interesting a message, the more likely for it to be forwarded by each recipient in the social network.
2) Appeal: How large is the human cluster that is interested in such message. The larger the hop distance, is the more likely that the social cluster interested in such topic is larger.

Therefore, hop distance may provide a unique metric that may be more meaningful in measuring relevancy of news posts over many of the more traditional mechanisms.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, hop server 106, and content server 108.

One embodiment of client devices 101-104 is described in more detail below in conjunction with FIG. 2. Generally, client devices 102-104 may include virtually any portable computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into an user account that may be managed by another computing device, such as content server 108, hop server 106, or the like. Such user account, for example, may be configured to enable the user to receive emails, send/receive IM messages, SMS messages, access selected web pages, participate in a social networking activity, provide messages that may include links or attachments, or the like. However, managing of messages may also be performed without logging into the user account.

Thus, a user of client devices 101-104 may employ any of a variety of client applications to access content, read articles, read messages, compose messages, send messages, or the like. In one embodiment, a user of client devices 101-104 may access a news article, or other item of interest from, for example, content server 108. The user may then select to forward a message to another user of one of client devices 101-104 about the accessed content, article, or the like.

The message may forwarded using any of a variety of message protocols, including but not limited to SMS, IM, MMS, email, or the like. Moreover, in one embodiment, the forwarded message may include a reference to the content, article, or message using, for example, an attachment, a link, a copy of the content, article, or message within the forwarded message, or virtually any other mechanism. The user may select to forward the message as a form of gossip (or any other form of communications) to members of a social network. It should be noted that the term gossip as used herein refers to a classification of content. However, the invention is not limited to merely managing gossip messages, and any content may be managed using the invention.

In one embodiment, the message may be forwarded anonymously such that the recipients may not readily determine from whom the message is actually forwarded. This may be performed in a variety of ways. For example, in one embodiment, a header of the forwarded message indicating a source of the message may be blank, may include an alias, a fake identifier, or the like.

When another user receives the forwarded message, that recipient user may select to ignore the message, read the message, delete the message, and/or forward the message to at least one other user of one of client devices 101-104. In one embodiment, as the message is forwarded to other members in the social network, a hop distance may be determined in real-time. In one embodiment, the hop distance may be determined by hop server 106 and provided to each client device receiving and/or forwarding the message. However, the invention is not so limited, and the hop distance may be determined using any of a variety of other mechanisms. For example, in one embodiment, one or more client devices receiving and/or forwarding the message may determine the hop distance. This may be performed using a variety of ways, including for example, including with the message information about a number of hops the message traversed to reach a recipient; sending an acknowledgement back through a chain of forwarding client devices where the acknowledgments may be used to determine the hop distance; or any of a variety of other ways. Thus, in one embodiment, the hop distance may be determined using any of a variety of peer-to-peer approaches, a server based approach, or even a combination of peer-to-peer and server based approach.

In any event, the hop distance may then be displayed at a client device, in one embodiment, along with the message, to indicate a level of interest by the members of the social network. That is, the more times the message is forwarded by different users in a sequence of users (e.g., client devices) the greater the determined hop distance. Thus, a user may view the hop distance as an indicator of how interesting or newsworthy the message may be.

In one embodiment, to whom the message is to be forwarded may be determined automatically based on an address book, buddy list, or any other form of contact list associated with the user requesting the message to be forwarded. For example, a user may employ a client application to indicate that a message is to be forwarded. When the indication is received by the client device, or other network device, the user's contact list may be examined to determine to whom to forward the message. Virtually any criteria may be used to determine the recipients of the message, including, for example, sending the message to each user identified in the contact list. In one embodiment, a determination may be made to ensure that the message is not forwarded to a user in the contact list that has already received the message. For example, if a second user received the message from a first user and is forwarding the message, then the message is not sent to the first user by the second user. Similarly, if the second user requests the message be forwarded multiple times, in one embodiment, users within the second user's contact list that received the message earlier would not receive the message again.

The determination of to whom the message is to be forwarded is not constrained to being automatically based on a contact list. For example, in another embodiment, the user requesting the message to be forwarded may also be allowed to edit a base list of users to whom the message is to be forwarded, create a list of users to be used or even to modify the automatically created list. Other mechanisms for determining to whom the message is to be forwarded are also envisaged, and thus the invention is not limited to these embodiments.

Wireless network 110 is configured to couple client devices 102-104 and its components with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple hop server 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of hop server 106 is described in more detail below in conjunction with FIG. 3. Briefly, however, hop server 106 may include any computing device capable of connecting to network 105 to enable managing of messages within asocial network using hop distances. In one embodiment, hop server 106 may provide an interface to a user of client devices 101-104 that may be used to post, spread, delete, or otherwise manage distribution of messages, including gossip messages.

Hop server 106 may further dynamically determine hop distances for respective messages, enable rank ordering of messages for a client device, and enable automatic deletion of a message based, in part, on hop distance. Hop server 106 may, in one embodiment, provide to a client device, a determined hop distance for display with a respective message. Thus, in one embodiment, a user of a client device may employ a client application with the provided hop server interface to display messages with their associated hop distances. In one embodiment, the hop distance may be configured to be dynamically updated in real-time for the client device as the message is forwarded through a social network of users, such as might be represented by client devices 101-104, or the like. In another embodiment, however, hop server 106 might enable the hop distance for a given message to initially be displayed to a client device as zero, blank, hidden, or the like, until the user of that client device selects to read the message, forward the message, or perform a predefined action. In this manner, the hop distance might be hidden so as not to influence a user of the client device, until the predefined action is performed.

In still another embodiment, hop server 106 might be configured to determine hop distance based on how a user of a client device responds to a received message. For example, in one embodiment, where a user receives a message and selects to forward the message to another client device, the hop distance might be determined based on a longest sequence of client devices for which the message is forwarded. In one embodiment, the hop distance displayed at a client device might be independent of whether the user forwarded the message or did not forward the message. That is, in one embodiment, the user might always see the hop distance to reflect the longest sequence, even if that user is not within the longest sequence of users. In another embodiment, if the user is not within the longest sequence, the hop distance displayed for that user might reflect the length of the sequence of users for which that user is a member. Two examples of such hop distance values displayed to a user are described in more detail below in conjunction with FIG. 5. However, the displayed hop distance for a given user is not limited to these embodiments, and any of a variety of other hop distances may be determined for display at a client device, without limiting the scope of the invention. Moreover, in one embodiment, hop server 106 may be configured to employ a process substantially similar to that described below in conjunction with FIG. 4 to perform at least some of its actions.

It should be noted that while FIG. 1 illustrates a use of hop server 106 to determine hop distances, the invention is not so limited. For example, as noted above, client devices 101-104 may also be configured with a client application, script, plug-in, applet, or the like, that is configured and arranged to enable the client device to manage messages using hop distances. Thus, in one embodiment, a client device may be enabled to determine hop distances for messages, independent of hop server 106. However, in still another embodiment, managing of messages based on hop distances may be performed through a combination of client devices, hop server, and even content sever 108, another network device, or the like.

Devices that may operate as hop server 106 include personal computers, desktop computers, multiprocessor systems, microprocessor-based or programmable consumer electronics, network PCs, servers, or the like. Although FIG. 1 illustrates hop server 106 as a single computing device, the invention is not so limited. For example, one or more functions of hop server 106 may be distributed across one or more distinct computing devices.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user. Moreover, content server 108 may also be configured to manage information for a user, such as an address book, buddy list, or other type of contact list. Such contact lists may be made available to hop server 106, in one embodiment.

Devices that may operate as content server 108 include, but are not limited to personal computers, desktop computers, multiprocessor systems, microprocessor-based or programmable consumer electronics, network PCs, servers, network appliances, and the like.

Illustrative Client Environment

Figure 2:
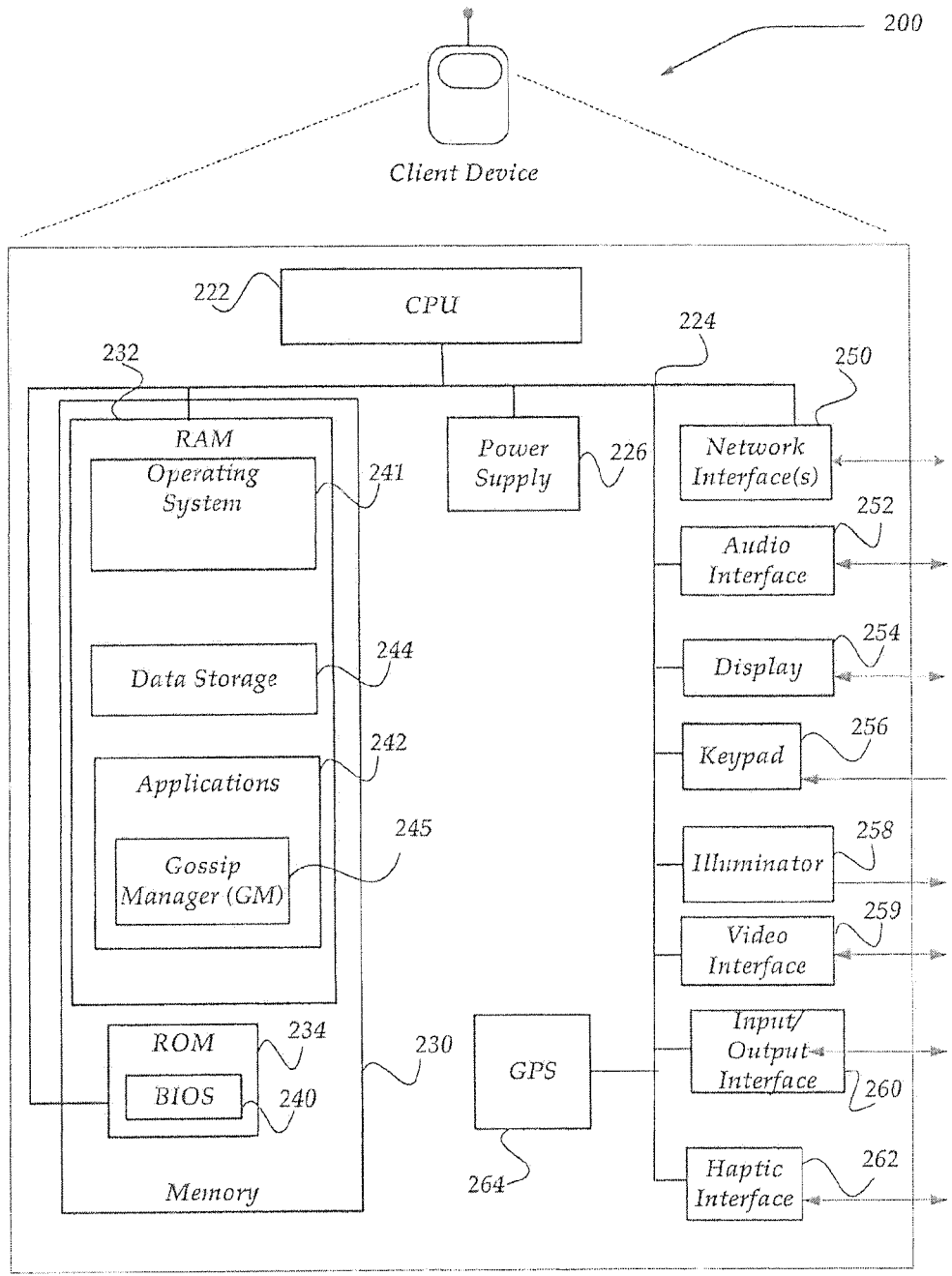
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communications technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include gossip manager (GM) 245. In one embodiment, GM 245 may be a browser application, such as a plug-in. However, in another embodiment, GM 245 may be an applet, script, distinct application, or the like, that is configured and arranged to enable managing of messages using hop distances. GM 245 may also be configured to interact with other applications to provide enhanced functionality to one or more other applications for managing messages. Thus, for example, GM 245 may operate in conjunction with a browser, messaging application or the like, to manage messages using hop distances. In one embodiment, GM 245 may also be an application, script, applet, plug-in, or other component downloaded over a network onto client device 200, and useable to enable the client device to manage messages using hop distance.

In one embodiment, GM 245 may provide a user interface that enables a user to view hop distances for a given message. In one embodiment, GM 245 may be configured to receive information as messages are received, deleted, forwarded, or the like, that may be used to determine hop distances. For example, in one embodiment, GM 245 may receive a string or other type of communication's that includes information such as a count of hops a received and/or forwarded message has traversed. Such communications may be implemented, in one embodiment, for example, using receiver acknowledgments, ACKs, or the like. However, the invention is not so constrained, and any of a variety of other communication's information and mechanisms may also be used.

In one embodiment, GM 245 may also employ the hop distance to rank order received messages for display to a user. In one embodiment, GM 245 may select to automatically delete or otherwise hide from display a message for which a hop distance is below a threshold value for some defined period of time. Thus, for example, if a hop distance appears to indicate that the message is not news-worthy because the hop distance is not above the threshold, the message may be deleted. In one embodiment, such deleted or hidden messages may be tagged or otherwise identified, such that if the message is received again for client device 200, the message will remain hidden or otherwise deleted. In another embodiment, if the message is received again, and the hop distance is now determined to be above the threshold, it may again be displayed.

In one embodiment, GM 245 may be configured and arranged to manage forwarding of a message. For example, where the user requests that a message be forwarded, GM 245 might automatically determine a list of recipients to whom the message is to be forwarded. In one embodiment, GM 245 might employ a contact list, or the like, to make such a determination. GM 245 may, in one embodiment, identify contacts within the list that have not received the message already from client device 200, and forward the message to client devices associated with those contacts. In another embodiment, GM 245 might enable the user of client device 200 to modify the potential recipient list, or even create the recipient list. In one embodiment, where the user indicates that a same message is to be forwarded multiple times, GM 245 may re-exam the contact list and ensure that the message is not sent to a same user multiple times, including, but not limited, to ensuring that the user that sent the message to client device 200 does not receive the message from client device 200.

As noted elsewhere, use of GM 245 is but one possible embodiment, and others are possible. For example, managing of hop distances may also be performed using a remote application, without departing from the scope of the invention.

Illustrative Server Environment

Figure 3:
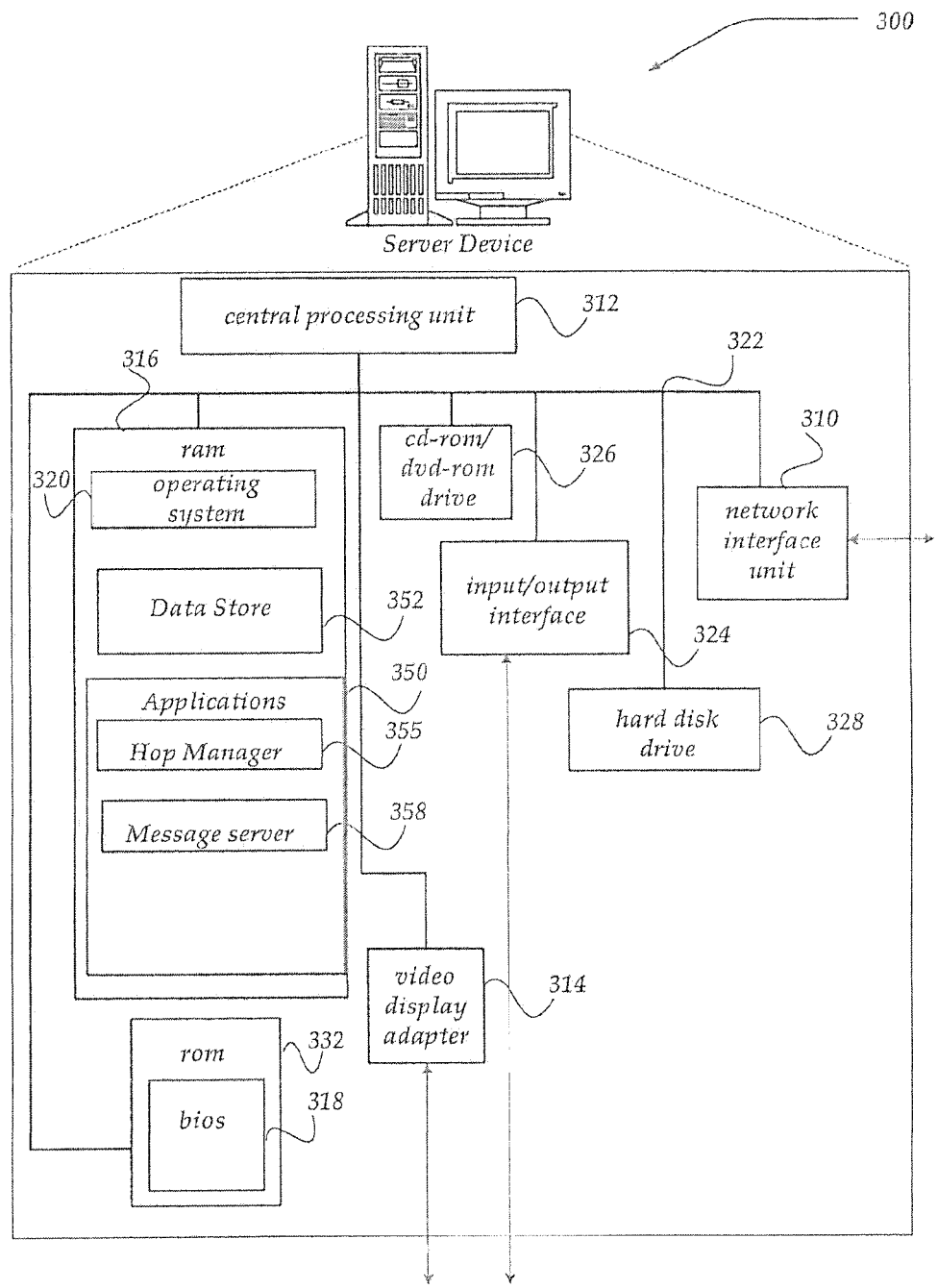
FIG. 3 shows one embodiment of a server device that may be included in a system implementing the invention.

FIG. 3 shows one embodiment of a network device, according to one embodiment of the invention. Server device 300 may include many more components than those shown. The components shown, however, are sufficient to disclose an illustrative embodiment for practicing the invention. Server device 300 may represent, for example, HOP SERVER 106 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include hop manager 355 and message server 358.

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages.

In one embodiment, message server 358 may communicate with hop manager 355 to enable a user to access messages with hop distance information. In one embodiment, hop manager 355 may provide a script, applet, application, or other downloadable component, to a client device for use in managing messages using hop distance. In another embodiment, hop manager 355 may provide information to message server 358, including an interface, or the like, for use in displaying, and/or otherwise managing messages with hop distances. Although not illustrated, in one embodiment, hop manager 355 may be configured as a plug-in, or the like, to message server 358.

In one embodiment, message server 358 may be configured and arranged to receive a message. In one embodiment, the message may be associated with hop distance information. Hop manager 355 may receive the hop distance information, and/or otherwise determine in real-time a hop distance for the message based on the received information. The determined hop distance may then be provided to message server 358 for display with the message. In one embodiment, the hop distance might not be displayed until, for example, the user performs some defined action, such as reading the message, forwarding the message, or the like. In one embodiment, the hop distance determined based on a number of hops the message traversed to the given user might be displayed with the message; but, the hop distance might not be updated if other recipients select to forward the message—until, for example, the given user selects to also forward the message.

In one embodiment, hop manager 355 may employ a contact list or the like, for a user stored in data store 352, accessible from a user's client device, or the like, to determine to whom a message is to be forwarded. In one embodiment, hop manager 355 may ensure that a message is not sent multiple times to a same contact within a user's contact list.

In one embodiment, hop manager 355 may interact with message server 358 to rank order messages for a user based on hop distance. Thus, in one embodiment, hop manager 355 (and/or message server 358) may select to display messages with higher hop distances higher on a rank ordered list of messages than other messages. As hop distances may, in one embodiment, dynamically change in real-time as the message is forwarded (or requested to be forwarded) through a social network, messages may dynamically change their position in the rank ordered display. In one embodiment, those messages with a hop distance below a threshold value for some defined time period may be deleted from the list or otherwise hidden from display. It this manner, more news-worthy, or socially interesting messages (as measured by hop distance) may be displayed more prevalently to a user, with less interesting messages being deleted (or hidden) automatically for the user.

Generalized Operation

Figure 4:
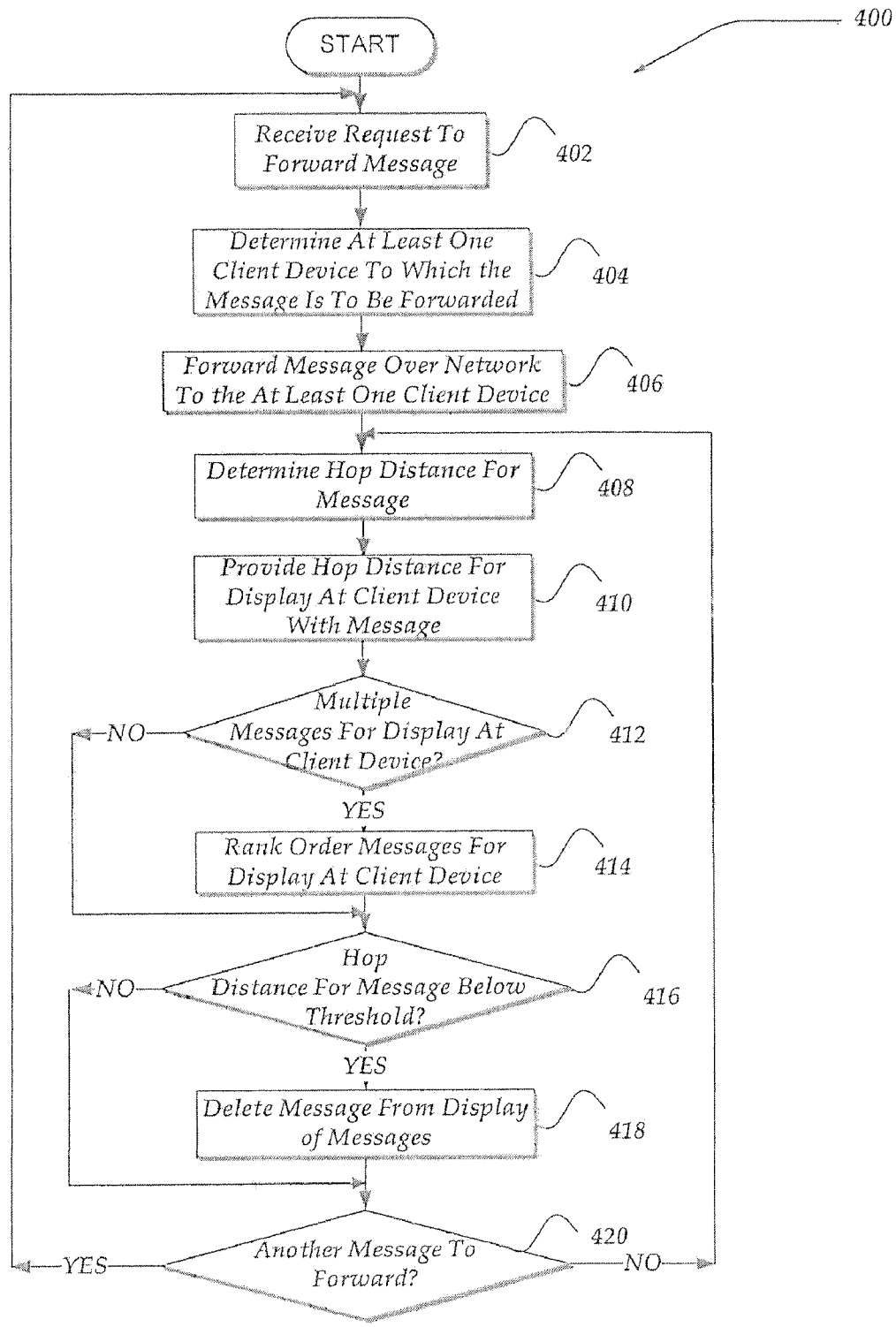
FIG. 4 illustrates a logical flow diagram generally showing one embodiment of a process for managing messages using hop distances to indicate a level of interest within a social network.

The operation of certain aspects of the invention will now be described with respect to FIG. 4. FIG. 4 illustrates a logical flow diagram generally showing one embodiment of a process for managing messages using hop distances to indicate a level of interest within a social network. In one embodiment, process 400 of FIG. 4 may be implemented within hop server 106 of FIG. 1. However, in another embodiment, process 400 may be implemented in one or more client devices 101-104 of FIG. 1. In still another embodiment, process 400 may be distributed across a combination of hop server 106 and/or one or more client devices 101-104.

In any event, process 400 begins, after a start block, at block 402, where a request to forward a message is received. In one embodiment, an interface may be provided to a user to enable the user to post or otherwise send a message. The message may be one that the user received from another user, or one that the user has composed. For example, the user might have viewed something, heard something, or the like, of interest, and wants to share the information. The user might insert content into a message body, including a link to an article, other content, or the like. The user may then select an icon, or the like, to request that the message be forwarded. In another embodiment, the user might read a received message and select to have that received message be forwarded. In one embodiment, the user might modify the message by including additional information in an associated message body, subject line, or the like.

Processing then flows to block 404, where to whom the message is to be forwarded is determined. In one embodiment, the user might be enabled to merely indicate that the message is to be "gossiped," using, for example, a forwarding indicator. In which instance, in one embodiment, an automatic determination of potential recipients may be performed. For example, a contact list, or the like, associated with the user may be accessed and contacts within the contact list may be identified as recipients. In one embodiment, if the message was forwarded to the user, and the forwarding user is identified within the contact list, that forwarding user might not be included as a potential recipient—thereby avoiding loop backs of the message. Thus, in one embodiment, the invention may be arranged such that the message does not get sent back to an originator of the message, and/or a forwarder of the message. Similarly, the contact list may be examined to determine if the message was sent to a contact already. If so, then one embodiment might ensure that the message is not re-sent to that contact. This analysis would then allow, for example, a user of process 400, to request a same message to be forwarded multiple times, to allow newly added contacts to the contact list to receive the message. In one embodiment, at block 404, the user might be allowed to also provide a list of one or more potential recipients, or otherwise, review the automatically determined list and to modify the list.

Process 400 then continues to block 406, where the message is then forwarded to one or more client devices associated with the potential recipients of the message. Processing then flows to block 408, where a hop distance may be determined in real-time for the message. In one embodiment, the hop distance may be determined based on a count of each request received to forward the message. Thus, if the message was requested to be forwarded to the user by a previous user, the hop distance might be one. When the present user requests that the message be forwarded, independent of the number of potential recipients the message is to be forwarded to, the hop distance would increase by one.

In one embodiment, recipients of the received message may similarly read the message, delete the message, modify the message, and/or forward the message. If a recipient selects to forward the message, such information may be provided, and used to dynamically revise the hop distance for the forwarding users.

Figure 5:
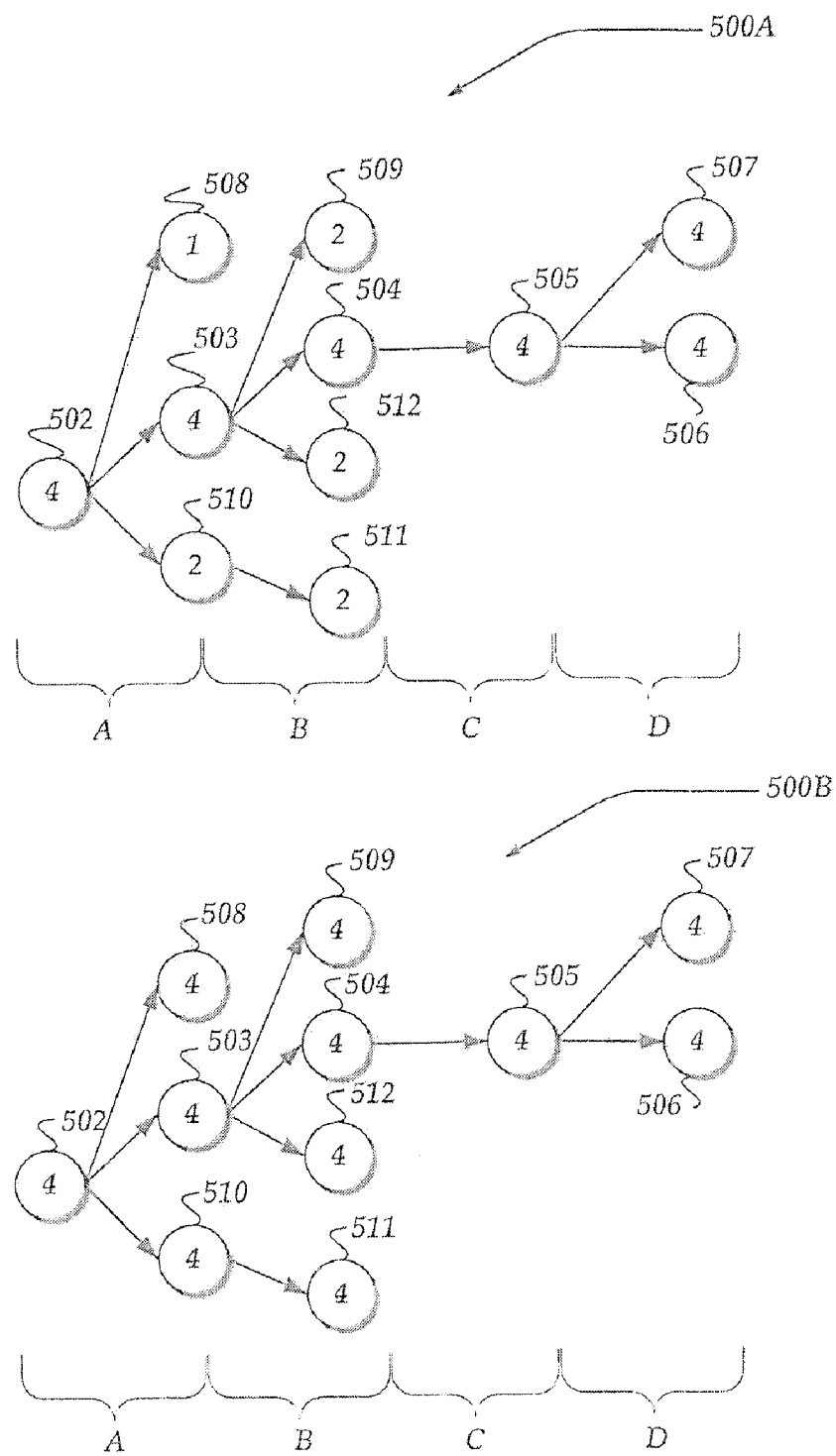
FIG. 5 illustrates relational diagrams generally showing example embodiments of hop distances for a message forwarded through the social network.

Briefly referring to FIG. 5, illustrations are shown of relational diagrams that generally show example embodiments of hop distances for a message forwarded through the social network. Shown in FIG. 5 are two example determinations 500A and 500B. Shown are users 502-512 and/or their client devices. In the each of the determinations, a message is forwarded from user 502 to users 503, 508, and 510. User 510 selects to forward the message to user 511, while user 503 selects to forward the message to users 504, 509, and 512. User 504 selects to forward the message to user 505, who in turns forwards the message to users 506-507. Users 508, 511, 509, 512, and 506-507 select to not forward the message.

Hop distance for the message may be determined based on each request received to forward the message. In another embodiment, the hop distance may be determined after the message is forwarded. Thus, in one embodiment, the hop distance may be based in part on a number of times the message is forwarded to other client devices (users) (or requested to be forwarded).

Thus, in example determination 500A each user within a sequence of message forwarders, inclusive of the originator may have a hop distance determined based on that sequence. As shown, for example, sequence of users 502-507 (or 506) includes four requests to forward (or four times in which the message is forwarded within the sequence). Thus, in one embodiment, users 502-507 (and 506) would have a hop distance of four.

Similarly, the message was requested (and forwarded) to user 508 once. Therefore, user 508, in one embodiment, would have a hop distance of one. Similarly, for users 510-511, the message was requested to be forwarded (and forwarded) twice in the sequence of users 502 and 510-511. Thus, users 510 and 511 would have a hop distance of two, and so forth as illustrated within example determination 500A.

However, in another embodiment, each user within the social network for which the message is forwarded (inclusive of the originating user) might have a hop distance based on a longest sequence of users for which the message traversed. Thus, as illustrated the sequence of users 502-507 (or 506) has the message traversing four users (client devices). Thus, each use would have a hop distance of four for that message.

It should be noted that FIG. 5 is intended to provide examples of possible hop distance determinations usable at block 408 of process 400, but is not intended to be exhaustive or otherwise limiting in any manner. Thus, other mechanisms for determining and/or otherwise displaying of hop distances may also be used.

Returning to process 400 of FIG. 4, processing flows next block 410, where for each recipient and/or forwarder of the message a hop distance may be displayed. In one embodiment, the hop distance may be revised in real-time for one or more of the message recipients and/or forwarders. For example, referring back to FIG. 5, when user 502 initially forwards the message, user 502's display might indicate a blank hop distance, a zero hop distance, or even a value of one. Then, when user 510 or 503 forwards the message, user 502 might see in real-time the hop distance for that message increment by one. Similarly, users 503 and 510 might see a zero, blank, or value of one initially for the hop distance for the message. When they forward the message, they may see the hop distance dynamically change in real-time by one. Thus, each time the message is requested and/or forwarded, one or more users in the sequence of the message may have the hop distance displayed dynamically change in real-time.

Processing flows next to decision block 412, where a determination is made whether the user's display includes multiple messages, each message having an associated hop distance. If so, processing flows to block 414; otherwise, processing branches to decision block 416.

At block 414, where each message within the multiple messages are rank ordered based on their respective hop distances for display at the client device. Processing continues to decision block 416.

At decision block 416, a determination is made whether a message has a hop distance below a threshold value for some determined time period. The time period may be determined based on a variety of factors. In is desirable to use sufficient time that allows users to receive, read, and/or forward a message, but not so long that the message might be considered "old news." Therefore, the time period may be based on an analysis of prior messages and their associated times, based on an estimated time, engineering judgment, or on any of a variety of other criteria. In any event, if the hop distance is below the threshold value for the determined time period, processing may flow to block 418, where the message is deleted or otherwise hidden from the display of messages. Processing then flows to decision block 420. Otherwise, if the hop distance is not below the threshold value, processing may branch to decision block 420.

At decision block 420, a determination is made whether another message is to be forwarded. If so, processing may loop back to block 402 to repeat the above process. If no more messages, processing may loop back to block 408 to dynamically determine in real-time hop distances for messages for the client device.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
a first component that is configured to enable a first client device to perform actions, including:
enabling a message to be forwarded to one or more other client devices including at least a second client device; and
a second component that is configured to perform actions, including:
receiving the message;
determining a hop distance for the message, usable to indicate a level of interest in the message, based in part on a number of times the message is forwarded to the one or more other client devices beyond at least the second client device;
enabling at least the one or more other client devices to modify the message that is then forwarded, in part, by including additional content with the message; and
selectively displaying, at one of the client devices receiving the message, the hop distance, wherein the hop distance indicates a longest sequence of client devices for which the message is forwarded independent of whether the one of the client devices is within the longest sequence.

2. The system of claim 1, wherein the additional content includes at least one of a link to an article or to an advertisement.

3. The system of claim 1, wherein the second component performs actions, further including:
displaying a revised hop distance for one of the client devices receiving the message, based in part on a number of client devices in a sequence of client devices for which the message is forwarded beyond the client device displaying the revised hop distance.

4. The system of claim 1, wherein the second component performs actions, further including:
displaying a plurality of messages, each message in the plurality having a respective hop distance, the display of the plurality of messages being in a rank ordering of messages that is based on the respective hop distances.

5. The system of claim 1, wherein the second component performs actions, further including:
inhibiting a display of the hop distance at a client device receiving the message until the receiving client device forwards the message to at least one other client device.

6. The system of claim 1, wherein the first component or the second component performs actions, further including:
automatically identifying at least one other client device to forward the message; and
forwarding the message anonymously to the identified at least one other client device.

7. A method, comprising:
forwarding a message from a first client device to one or more other client devices, including at least a second client device;
dynamically determining a hop distance for the message, usable to indicate a level of interest in the message, based in part on a number of times the message is forwarded to other client devices beyond at least the second client, wherein at least one of the other client devices forwarding the message modifies the message being forwarded; and
selectively displaying to at least one of the client devices forwarding the message, the hop distance for the message.

8. The method of claim 7, wherein the message is selectively displayed at the first client device with a plurality of other messages, each message being displayed with an associated determined hop distance for the respective message.

9. The method of claim 8, wherein the plurality of messages are displayed in a rank ordering based on their respective hop distances such that when a hop distance for a message changes, the rank ordering of the messages selectively changes.

10. The method of claim 7, wherein the message is modified by including an advertisement or a link to an advertisement.

11. The method of claim 7, further comprising:
automatically identifying at least one additional client device to forward the message; and
forwarding the message anonymously to the identified at least one additional client device.

12. The method of claim 11, wherein automatically identifying at least one additional client device is based on identifying a user associated with the at least one additional client device within a contact list, and forwarding the message such that each user receiving the forwarded message does not receive the message multiple times.

13. The method of claim 7, wherein the hop distance is selectively displayed for at least the second client device, to further indicate a number of times the message is forwarded in a sequence that includes the second client device.

14. A network device, comprising:
a transceiver to send and receive messages; and
a processor that is operative to perform actions, comprising:
receiving from each of a plurality of different client devices a request to forward a message, wherein at least one of the requests includes modifying the message;
forwarding the message based on the requests;
for each client device associated with the forwarded message determining, in real-time, a hop distance for the message, usable to indicate a level of interest in the message, based in part on a number of times the message is forwarded to other client devices; and displaying the message and selectively displaying an associated hop distance to at least one client device in a sequence of client devices that forwards the message.

15. The network device of claim 14, wherein the hop distance further indicates a number of times the message is forwarded to reach a given client device in the sequence of client devices.

16. The network device of claim 14, the processor performing further actions, including:
automatically identifying at least one additional client device to forward the message based on a contact list associated with a user of a forwarding client device; and
forwarding the message to at one or more contacts in the contact list such that each of the one or more contacts does not receive the message multiple times.

17. The network device of claim 14, wherein the modified message is modified to include an advertisement or a link to an advertisement.

18. The network device of claim 14, wherein a respective hop distance for the message is further determined based on a longest sequence of client devices for which the message is forwarded.

19. The network device of claim 14, wherein selectively displaying the hop distance further comprises inhibiting the display of the hop distance until a respective client device forwards the associated message.

* * * * *